United States Patent
Yu et al.

(10) Patent No.: US 12,470,838 B2
(45) Date of Patent: Nov. 11, 2025

(54) METHOD AND APPARATUS WITH WHITE BALANCING

(71) Applicants: SAMSUNG ELECTRONICS CO., LTD., Suwon-si (KR); UIF (University Industry Foundation), Yonsei University, Seoul (KR)

(72) Inventors: Junsang Yu, Suwon-si (KR); Dong Young Kim, Seoul (KR); Seon Joo Kim, Seoul (KR); Kinam Kwon, Suwon-si (KR); Hyong Euk Lee, Suwon-si (KR)

(73) Assignees: Samsung Electronics Co., Ltd., Suwon-si (KR); UIF (University Industry Foundation), Yonsei University, Seoul (KR)

(*) Notice: Subject to any disclaimer, the term of this patent is extended or adjusted under 35 U.S.C. 154(b) by 296 days.

(21) Appl. No.: 18/358,250

(22) Filed: Jul. 25, 2023

(65) Prior Publication Data

US 2024/0292116 A1    Aug. 29, 2024

(30) Foreign Application Priority Data

Feb. 28, 2023   (KR) .................. 10-2023-0026937
Mar. 23, 2023   (KR) .................. 10-2023-0038178

(51) Int. Cl.
*H04N 23/88*   (2023.01)
*G06T 7/90*    (2017.01)
*H04N 1/60*    (2006.01)

(52) U.S. Cl.
CPC .............. *H04N 23/88* (2023.01); *G06T 7/90* (2017.01); *H04N 1/6086* (2013.01); *G06T 2207/10024* (2013.01)

(58) Field of Classification Search
CPC ..................................................... H04N 23/88
See application file for complete search history.

(56) References Cited

U.S. PATENT DOCUMENTS

| | | | |
|---|---|---|---|
| 8,994,848 B2 | 3/2015 | Husoy | |
| 10,070,111 B2 | 9/2018 | Sunkavalli et al. | |
| 12,164,559 B2* | 12/2024 | Weinzaepfel | G06N 3/08 |
| 2024/0135494 A1 | 4/2024 | Yu et al. | |

FOREIGN PATENT DOCUMENTS

| | | |
|---|---|---|
| JP | 6934240 B2 | 9/2021 |
| KR | 10-2277005 B1 | 7/2021 |
| WO | WO 2021/158642 A1 | 8/2021 |

* cited by examiner

*Primary Examiner* — James M Hannett
(74) *Attorney, Agent, or Firm* — NSIP Law

(57) ABSTRACT

An electronic device includes a processor configured to perform operations including inputting an image into an encoder to generate a feature map including information about an illumination present in the input image, iteratively updating a plurality of slot vectors using the calculated feature map to calculate a plurality of predicted illumination vectors, calculating, using the calculated plurality of predicted illumination vectors, a plurality of mixture maps representing respective effects of a plurality of virtual illuminations on pixels in the input image and a plurality of illumination color vectors representing respective color values of the plurality of virtual illuminations, and generating an illumination map using the calculated plurality of mixture maps and the calculated plurality of illumination color vectors.

27 Claims, 10 Drawing Sheets

METHOD AND APPARATUS WITH WHITE BALANCING

CROSS-REFERENCE TO RELATED APPLICATIONS

This application claims the benefit under 35 USC § 119(a) of Korean Patent Application No. 10-2023-0026937, filed on Feb. 28, 2023, and Korean Patent Application No. 10-2023-0038178, filed on Mar. 23, 2023, in the Korean Intellectual Property Office, the entire disclosures, all of which, are incorporated herein by reference for all purposes.

BACKGROUND

1. Field

The following disclosure relates to method and apparatus with white balancing.

2. Description of Related Art

White balance may refer to a technique for correcting the effect of illumination in a captured environment on pixels so that a white object appears white in an image. Conventional white balance was performed by correcting the colors of an image under the assumption that a single illumination is present in the image. However, in an actual environment where an image capture takes place, there may not be a single source of illumination but rather a plurality of illumination sources that may be distributed in a space. Conventional white balance estimates the chromaticity of a single illumination source and corrects the colors of an image according to the estimated chromaticity under the assumption that a single illumination source is present in the image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a processor-implemented method including inputting an image into an encoder to generate a feature map including information about an illumination present in the input image, iteratively updating a plurality of slot vectors using the calculated feature map to calculate a plurality of predicted illumination vectors, calculating, using the calculated plurality of predicted illumination vectors, a plurality of mixture maps representing respective effects of a plurality of virtual illuminations on pixels in the input image and a plurality of illumination color vectors representing respective color values of the plurality of virtual illuminations, and generating an illumination map using the calculated plurality of mixture maps and the calculated plurality of illumination color vectors.

Respective dimensions of each of the plurality of slot vectors are equal to a number of channels of the calculated feature map.

The iteratively updating the plurality of slot vectors includes updating the plurality of slot vectors a preset number of times through a neural network model.

The iteratively updating the plurality of slot vectors further may include inputting the calculated feature map into a multi-layer perceptron to calculate a key and a value having a same size as the calculated feature map and setting the plurality of slot vectors as a query.

The iteratively updating the plurality of slot vectors may include applying a softmax function to a result of a dot product between the query and the key along a channel axis to calculate a plurality of attention maps, normalizing the calculated plurality of attention maps along a spatial axis and then multiplying the normalized plurality of attention maps by the value to calculate a plurality of candidate vectors, and inputting the calculated plurality of candidate vectors into the neural network model to update the plurality of slot vectors with output values of the neural network model.

The neural network model may be one of a decoder of a transformer model, a long short-term memory (LSTM) model, and a gated recurrent unit (GRU) model.

The calculating of the plurality of mixture maps and the plurality of illumination color vectors may include applying a softmax function to results of dot products between the calculated plurality of predicted illumination vectors and the key along a channel axis to calculate the plurality of mixture maps and inputting the calculated plurality of predicted illumination vectors into a linear layer to calculate the plurality of illumination color vectors.

The generating of the illumination map may include setting weights respectively for the plurality of illumination color vectors corresponding to the plurality of virtual illuminations, multiplying, for each of the plurality of virtual illuminations, a result of applying a weight, set for an illumination color vector corresponding to a corresponding virtual illumination, to the corresponding illumination color vector by a mixture map corresponding to the corresponding virtual illumination to calculate a candidate map, and summing a plurality of candidate maps calculated respectively for the plurality of virtual illuminations along a channel axis to generate the illumination map.

The method may include training an illumination decomposition framework for generating the illumination map from the input image based on training data including a training input image, a ground truth illumination map mapped with the training input image, a plurality of ground truth illumination color vectors mapped with the training input image, and a plurality of ground truth mixture maps mapped with the training input image.

The training of the illumination decomposition framework may include inputting the training input image into the encoder to calculate a temporary feature map, calculating a plurality of temporary mixture maps and a plurality of temporary illumination color vectors from the calculated temporary feature map, calculating a temporary illumination map using the calculated plurality of temporary mixture maps and the calculated plurality of temporary illumination color vectors, calculating an illumination map loss based on the temporary illumination map and the ground truth illumination map, calculating an illumination color loss based on the plurality of temporary illumination color vectors and the plurality of ground truth illumination color vectors, and training the illumination decomposition framework based on a total loss including the calculated illumination map loss and the calculated illumination color loss.

The calculating of the illumination color loss may include determining a temporary illumination color vector matching an individual ground truth illumination color vector among the plurality of temporary illumination color vectors and calculating the illumination color loss using the plurality of ground truth illumination color vectors and temporary illumination color vectors respectively matching the plurality of ground truth illumination color vectors.

The determining of the temporary illumination color vector matching the individual ground truth illumination color vector may include calculating a distance between any temporary mixture map among the plurality of temporary mixture maps and any ground truth mixture map among the plurality of ground truth mixture maps, setting a plurality of distances calculated between the plurality of temporary mixture maps and the plurality of ground truth mixture maps as costs and applying a Hungarian matching algorithm to the set costs to determine a temporary mixture map matching an individual ground truth mixture map by, and matching a ground truth illumination color vector corresponding to the individual ground truth mixture map and a temporary illumination color vector corresponding to a temporary mixture map matching the individual ground truth mixture map.

The training of the illumination decomposition framework may include calculating a mixture map loss based on the plurality of temporary mixture maps and the plurality of ground truth mixture maps and training the illumination decomposition framework based on the total loss including the calculated illumination map loss, the calculated illumination color loss, and the calculated mixture map loss.

In a general aspect, here is provided an electronic device including a processor configured to calculate a feature map including information about an illumination present in an input image based on inputting the input image into an encoder, calculate a plurality of predicted illumination vectors by iteratively updating a plurality of slot vectors using the calculated feature map, calculate, using the calculated plurality of predicted illumination vectors, a plurality of mixture maps representing respective effects of a plurality of virtual illuminations on pixels in the input image and a plurality of illumination color vectors representing respective color values of the plurality of virtual illuminations, and calculate an illumination map using the calculated plurality of mixture maps and the calculated plurality of illumination color vectors.

The processor may be further configured to calculate a key and a value having a same size as the calculated feature map by inputting the calculated feature map into a multilayer perceptron, and set the plurality of slot vectors as a query.

The processor may be further configured to calculate a plurality of attention maps by applying a softmax function to a result of a dot product between the query and the key along a channel axis, calculate a plurality of candidate vectors by normalizing the calculated plurality of attention maps along a spatial axis and then multiplying the normalized plurality of attention maps by the value, and update the plurality of slot vectors with output values of the neural network model based on inputting the calculated plurality of candidate vectors into the neural network model.

The processor may be further configured to calculate the plurality of mixture maps by applying a softmax function to results of dot products between the calculated plurality of predicted illumination vectors and the key along a channel axis and calculate the plurality of illumination color vectors by inputting the calculated plurality of predicted illumination vectors into a linear layer.

The processor may be further configured to set weights respectively for the plurality of virtual illuminations, generate, for each of the plurality of virtual illuminations, a candidate map by multiplying a result of applying a weight, set for an illumination color vector corresponding to a corresponding virtual illumination, to the corresponding illumination color vector by a mixture map corresponding to the corresponding virtual illumination, and generate the illumination map by summing a plurality of candidate maps calculated respectively for the plurality of virtual illuminations along a channel axis.

The processor may be further configured to train an illumination decomposition framework for generating the illumination map from the input image based on training data including a training input image, a ground truth illumination map mapped with the training input image, a plurality of ground truth illumination color vectors mapped with the training input image, and a plurality of ground truth mixture maps mapped with the training input image.

The processor may be further configured to calculate a temporary feature map based on inputting the training input image into the encoder, calculate a plurality of temporary mixture maps and a plurality of temporary illumination color vectors from the calculated temporary feature map, calculate a temporary illumination map using the calculated plurality of temporary mixture maps and the calculated plurality of temporary illumination color vectors, calculate an illumination map loss based on the temporary illumination map and the ground truth illumination map, calculate an illumination color loss based on the plurality of temporary illumination color vectors and the plurality of ground truth illumination color vectors, and train the illumination decomposition framework based on a total loss including the calculated illumination map loss and the calculated illumination color loss.

In a general aspect, here is provided a processor implemented method including generating, by an encoder employing a neural network, a feature map according to lamination information of an input image, iteratively updating slot vectors of a plurality of slot vectors using the feature map to predict illumination vectors from the feature map, calculating, using the illumination vectors, a plurality of mixture maps representing representative effects of virtual illumination sources, and generating an illumination map for the input image based on the representative effects and the plurality of mixture maps.

The representative effects of the virtual illumination sources may include effects on respective pixels in the input image and a plurality of color vectors from respective virtual illumination sources.

The method may include performing white balancing on the input image by blending the representative effects and the plurality of mixture maps.

A number of the plurality of slot vectors may be greater than or equal to a number of light sources present in the input image.

A number of channels of the feature map may be equal to a fourth number of dimensions of the feature map.

The iterative updating of the plurality of slot vectors may be generated by a slot attention model calculating a key and a value, the value being a size of the feature map.

The slot attention model may calculate a query based on the plurality of slot vectors and the calculating the plurality of mixture maps by applying a softmax function to a dot product between the key and the query.

Other features and aspects will be apparent from the following detailed description, the drawings, and the claims.

Figure 1:
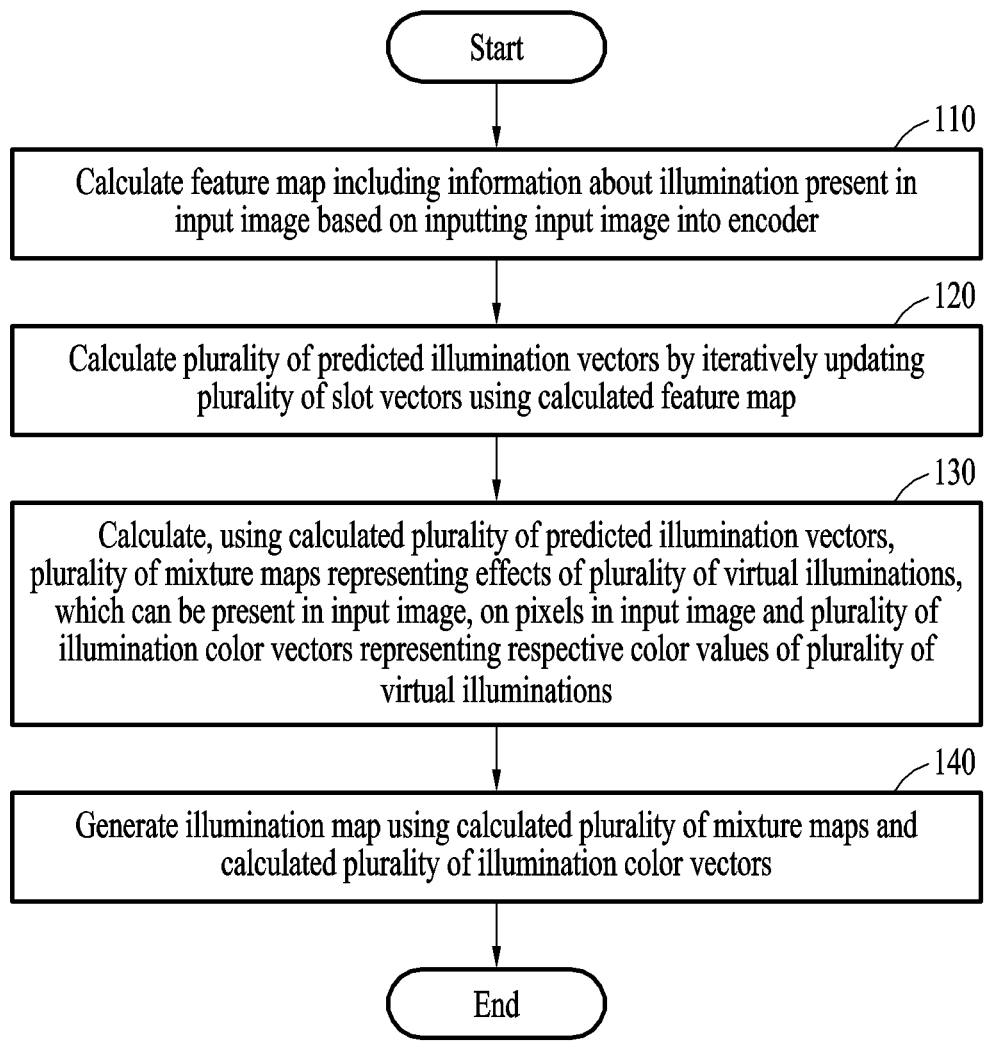
FIG. 1 illustrates an example method with white balancing according to one or more embodiments.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

In a typical process of generating an illumination map for an image, if a plurality of illumination sources are present in that image, a typical white balance approach may provide unsatisfactory white balancing results because the typical results may fail to accurately estimate the effect of the actual illumination being provided by the plurality of illumination sources in any area of the image.

FIG. 1 illustrates an example method with white balancing according to one or more embodiments.

Referring to FIG. 1, in a non-limiting example, in operation 110, an electronic device (e.g., electronic device 1100 of FIG. 11) may calculate a feature map including information about an illumination present in an input image based on providing the input image into an encoder.

In an example, the encoder may employ machine learning. For example, the encoder may train a convolutional neural network (CNN) or a structure of a U-Net. When the input image is input into the encoder, the encoder may generate a feature map by expanding the input image along a channel axis while maintaining the resolution of the input image the same.

In operation 120, the electronic device may calculate a plurality of predicted illumination vectors by iteratively updating a plurality of slot vectors using the calculated feature map.

In an example, the electronic device may preset a number of the plurality of slot vectors to be more than or equal to the number of illumination sources present in the input image. For ease of description, examples in which a plurality of illuminations (e.g., illumination sources) are present in an input image are mainly described, but examples are not limited thereto, and a single illumination (e.g., light source) may be present in an input image.

In operation 130, the electronic device may calculate, using the calculated plurality of predicted illumination vectors, a plurality of mixture maps representing the respective effects of a plurality of virtual illumination sources, which may be present in the input image, on pixels in the input image and a plurality of illumination color vectors representing respective color values of the plurality of virtual illumination sources.

In operation 140, the electronic device may generate an illumination map using the calculated plurality of mixture maps and the calculated plurality of illumination color vectors. The electronic device may generate the illumination map to perform white balancing on the input image by blending the calculated plurality of mixture maps and the calculated plurality of illumination color vectors.

In an example, the electronic device may perform white balancing on the input image using the generated illumination map. The electronic device may adjust a color value of a target pixel in the input image using a color value of a pixel at a same position as a position of the target pixel of the input image in the illumination map.

Figure 2:
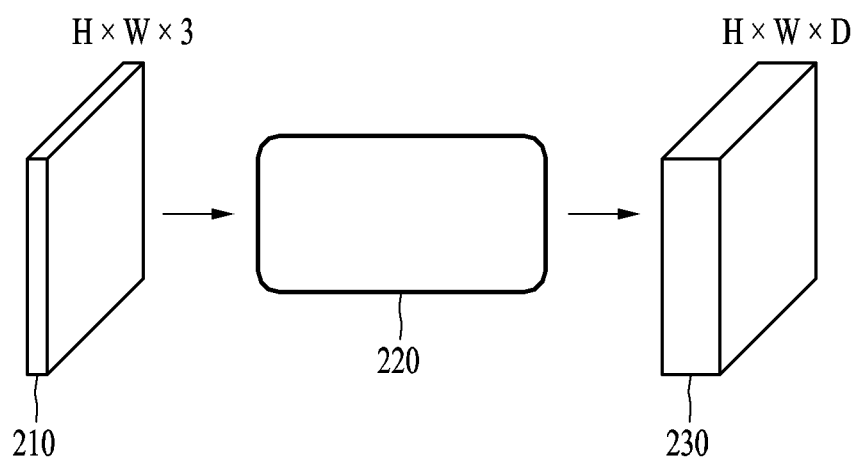
FIG. 2 illustrates an example process of extracting a feature map corresponding to an input image according to one or more embodiments.

FIG. 2 illustrates an example process of extracting a feature map corresponding to an input image using an encoder according to one or more embodiments.

Referring to FIG. 2, in a non-limiting example, an electronic device (e.g., the electronic device 1100 of FIG. 11) may calculate a feature map 230 including information about an illumination source present in an input image 210 based on inputting the input image 210 into an encoder 220. Here, the encoder 220 may employ machine learning (e.g., a neural network).

In an example, based on the input image 210, where the input image 210 includes a first number of channels (e.g., "3" channels) and is input into the encoder 220, the electronic device may calculate the feature map 230 including a second number of channels (e.g., "64" channels) that is greater than the first number of channels. In an example, when the encoder 220 receives a H×W×3 input image 210 having "3" channels (e.g., a red channel, a blue channel, and a green channel) and a resolution of H×W, the encoder 220 may output a H×W×D feature map 230 that is expanded along the channel axis while maintaining a resolution of H×W which is the same resolution as the resolution of the input image 210. In an example, D may be an integer greater than or equal to "3".

Figure 3:
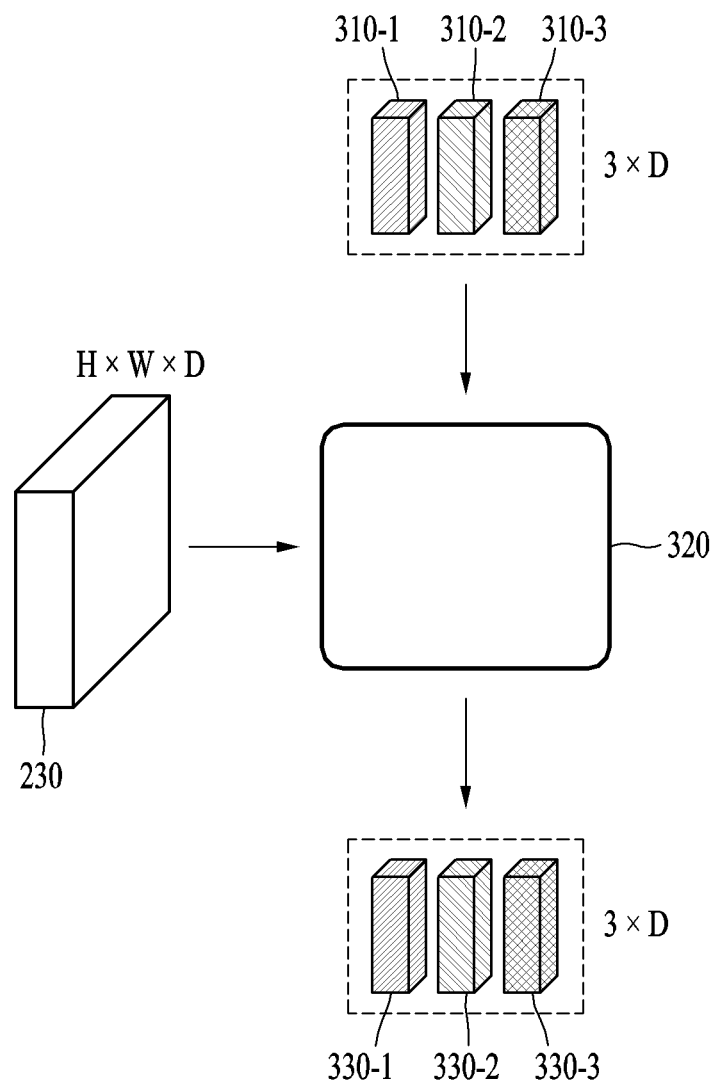
FIGS. 3 and 4 illustrate an example process of calculating predicted illumination vectors using a feature map according to one or more embodiments.
Figure 4:
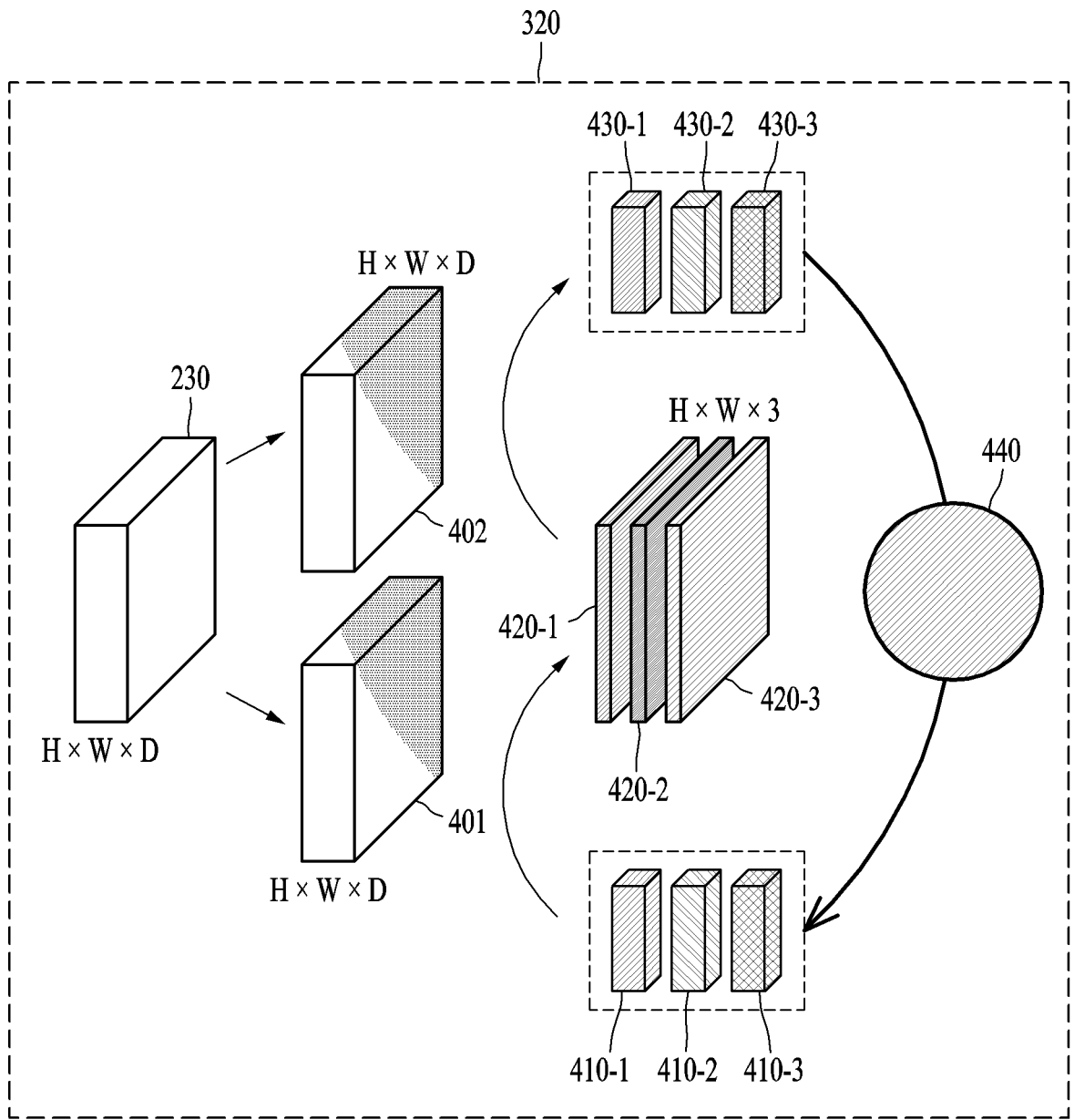

FIGS. 3 and 4 illustrate example processes of calculating predicted illumination vectors using a feature map according to one or more embodiments.

Referring to FIG. 3, in a non-limiting example, an electronic device (e.g., electronic device 1100 of FIG. 11) may calculate a plurality of predicted illumination vectors 330-1, 330-2, and 330-3 based on inputting a feature map 230 extracted from an encoder (e.g., the encoder 220 of FIG. 2) and a plurality of slot vectors 310-1, 310-2, and 310-3 into a slot attention module 320. The slot attention module 320 may generate the plurality of predicted illumination vectors 330-1, 330-2, and 330-3 by iteratively updating the plurality of slot vectors 310-1, 310-2, and 310-3 using the feature map 230 through an attention mechanism.

The electronic device may generate a preset number of slot vectors 310-1, 310-2, and 310-3. The electronic device may generate slot vectors to be more than or equal to the number of illumination sources present in an input image (e.g., the input image 210 of FIG. 2). In example, when a maximum of two illumination sources are present in the input image, the electronic device may generate three slot vectors 310-1, 310-2, and 310-3.

The electronic device may generate the plurality of slot vectors 310-1, 310-2, and 310-3 so that a slot vector (e.g., the slot vector 310-1) may have a dimension equal to the number of channels of the feature map 230 (e.g., D). In other words, the dimension of each of the plurality of slot vectors 310-1, 310-2, and 310-3 may be equal to the number of channels of the feature map 230.

For example, when the feature map 230 includes "64" channels, the electronic device may generate the slot vector (e.g., the slot vector 310-1) as a 64-dimensional vector. After generating the plurality of slot vectors 310-1, 310-2, and 310-3, the electronic device may initialize each of the generated plurality of slot vectors 310-1, 310-2, and 310-3 with learnable parameters.

In an example, the slot attention model 320 may use machine learning (e.g., a neural network model) in the process of updating the plurality of slot vectors 310-1, 310-2, and 310-3 using the feature map 230 corresponding to the input image. The slot attention model 320 may calculate the plurality of predicted illumination vectors 330-1, 330-2, and 330-3 by updating the plurality of slot vectors 310-1, 310-2, and 310-3 a preset number of times through a neural network model. The slot attention model 320 may generate a predicted illumination vector (e.g., the predicted illumination vector 330-1) in a dimension the same as that of the slot vector (e.g., the slot vector 310-1) (e.g., D-dimension).

Referring to FIG. 4, in a non-limiting example, the slot attention model 320 of FIG. 3 may iteratively update a plurality of slot vectors 410-1, 410-2, and 410-3 using an attention mechanism. The slot attention model 320 may calculate a query, a key (e.g., key 401), and a value (e.g., value 402) to apply the attention mechanism.

The slot attention model 320 may calculate a key 401 and a value 402 having the same size (H×W×D) as the feature map 230 by inputting the H×W×D feature map 230 into a multi-layer perceptron (MLP). The slot attention model 320 may set the plurality of slot vectors 410-1, 410-2, and 410-3 as a query.

In a non-limiting example, the slot attention model 320 may calculate a plurality of attention maps 420-1, 420-2, and 420-3 by applying a softmax function to results of dot products between the plurality of slot vectors 410-1, 410-2, and 410-3 and the key 401 along the channel axis. In an example, the softmax function may normalize an attention weight calculated by the query and the key 401. For example, the slot attention model 320 may apply the softmax function to the result of a dot product between the query and the key 401 along the channel axis in a manner of adjusting the sum of weights of pixels to be "1". For example, the slot attention model 320 may generate the H×W×3 attention maps 420-1, 420-2, and 420-3 by applying the softmax function to the results of dot products between the 3×D slot vectors 410-1, 410-2, and 410-3 and the H×W×D key 401. In other words, the size of one slot vector (e.g., the slot vector 410-1) may be 1×D, and the size of one attention map (e.g., the attention map 420-1) may be H×W.

After generating the plurality of attention maps 420-1, 420-2, and 420-3, the slot attention model 320 may normalize each of the plurality of attention maps 420-1, 420-2, and 420-3 along a spatial axis. In other words, the slot attention model 320 may perform normalization so that the sum of weights of all pixels in each attention map (e.g., the attention map 420-1) may be "1".

The slot attention model 320 may generate a plurality of candidate vectors 430-1, 430-2, and 430-3 by normalizing the plurality of attention maps 420-1, 420-2, and 420-3 along the spatial axis and then multiplying the normalized plurality of attention maps 420-1, 420-2, and 420-3 by the value 402. In an example, the slot attention model 320 may generate the 1×D candidate vector 430-1 by normalizing the H×W attention map 420-1 and then multiplying the normalized attention map 420-1 by the H×W×D value 402. In an example, the slot attention model 320 may generate the 1×D candidate vector 430-2 by normalizing the H×W attention map 420-2 and then multiplying the normalized attention map 420-2 by the H×W×D value 402.

The slot attention model 320 may update the plurality of slot vectors 410-1, 410-2, and 410-3 with output values of a neural network model 440 based on inputting the plurality of candidate vectors 430-1, 430-2, and 430-3 into the neural network model 440. In an example, the neural network model 440 may be one of a decoder of a transformer model, a long short-term memory (LSTM) model, and a gated recurrent unit (GRU) model.

The slot attention model 320 may update the plurality of slot vectors 410-1, 410-2, and 410-3 a preset number of times through the attention mechanism. The slot attention model 320 may calculate a plurality of predicted illumination vectors (e.g., the plurality of predicted illumination vectors 330-1, 330-2, and 330-3 of FIG. 3) by updating the slot vectors 410-1, 410-2, and 410-3 the preset number of times through the neural network model 440.

The slot attention model 320 may fix the key 401 and the value 402 while iteratively updating the plurality of slot vectors 410-1, 410-2, and 410-3. The slot attention model 320 may iteratively update the plurality of slot vectors 410-1, 410-2, and 410-3 in the same manner. The slot attention model 320 may iteratively update the plurality of slot vectors 410-1, 410-2, and 410-3 a preset number of times and then, set the updated plurality of slot vectors 410-1, 410-2, and 410-3 as a plurality of predicted illumination vectors (e.g., the plurality of predicted illumination vectors 330-1, 330-2, and 330-3 of FIG. 3).

Figure 5:
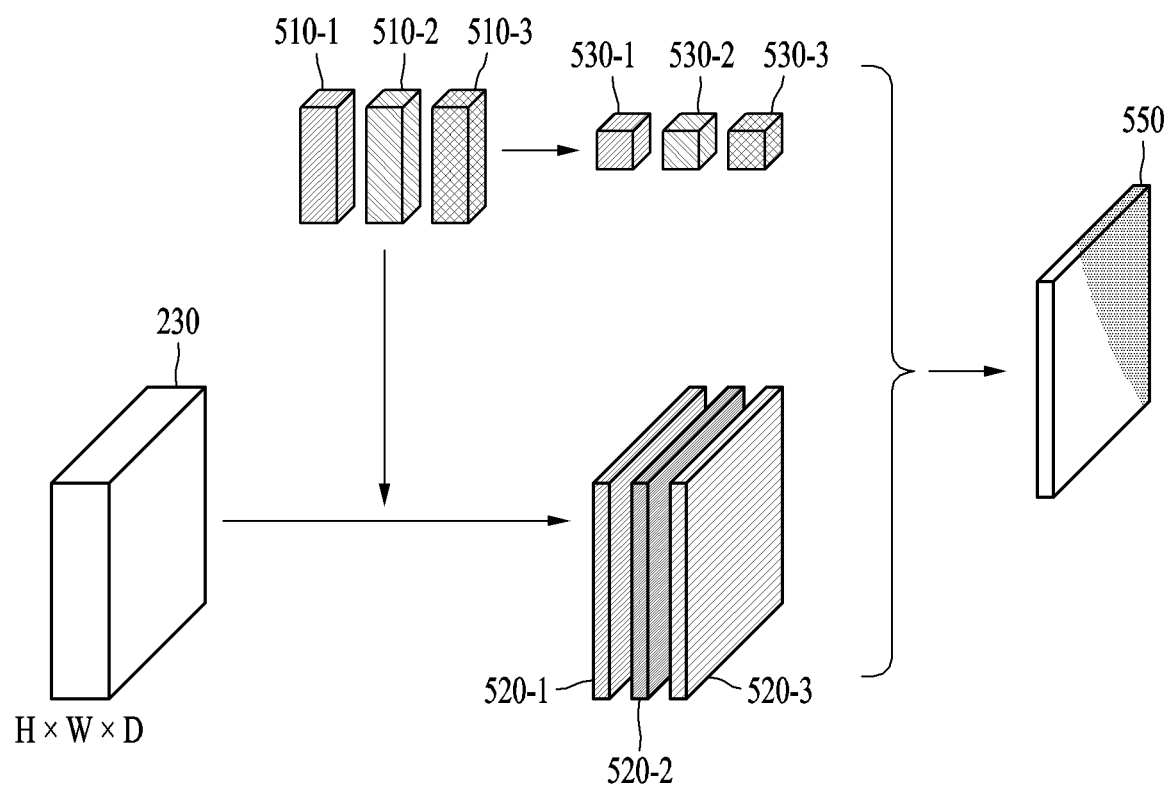
FIG. 5 illustrates an example process of generating an illumination map according to one or more embodiments.

FIG. 5 illustrates an example process of generating an illumination map according to one or more embodiments.

Referring to FIG. 5, in a non-limiting example, an electronic device (e.g., the electronic device 1100 of FIG. 11) may calculate, using a plurality of predicted illumination vectors 510-1, 510-2, and 510-3 calculated by a slot attention model (e.g., the slot attention model 320 of FIG. 3), a plurality of mixture maps 520-1, 520-2, and 520-3 representing the respective effects of a plurality of virtual illumination sources, which can be present in an input image, on pixels in the input image. The electronic device 500 may generate the virtual illumination sources, which can be present in the input image, as many as the number of pre-generated slot vectors (e.g., "3"). Each of the plurality of predicted illumination vectors 510-1, 510-2, and 510-3 calculated by the slot attention model may correspond to one virtual illumination source, which can be present in the input image.

In an example, the electronic device may calculate a plurality of mixture maps 520-1, 520-2, and 520-3 by applying the softmax function to the results of dot products between the plurality of predicted illumination vectors 510-1, 510-2, and 510-3 and a key derived from the feature map 230 (e.g., the key 401 of FIG. 4) along the channel axis. For example, the mixture map 520-1 may represent the effect of a virtual illumination source corresponding to the predicted illumination vector 510-1 on the pixels in the input image. A weight value of a pixel in the mixture map 520-1 may represent the effect of the virtual illumination source corresponding to the predicted illumination vector 510-1 on a pixel at the same position as the corresponding pixel of the mixture map 520-1 in the input image.

In an example, the electronic device may calculate, using the plurality of predicted illumination vectors 510-1, 510-2, and 510-3 calculated by the slot attention model, a plurality of illumination color vectors 530-1, 530-2, and 530-3 representing the respective color values of the plurality of virtual illumination sources, which can be present in the input image.

In an example, the electronic device may calculate the plurality of illumination color vectors 530-1 and 530-2, and 530-3 by inputting the plurality of predicted illumination vectors 510-1, 510-2, and 510-3 into a linear layer. The linear layer may convert the plurality of predicted illumination vectors 510-1, 510-2, and 510-3 into the plurality of illumination color vectors 530-1, 530-2, and 530-3, respectively. In other words, the linear layer may generate a two-dimensional illumination color vector (e.g., the illumination color vector 530-1) by performing a linear transform on a D-dimensional predicted illumination vector (e.g., the predicted illumination vector 530-1).

The two-dimensional illumination color vector may include the red value and the blue value of a virtual illumination source as elements. Since the electronic device presets the green value of a virtual illumination source to a predetermined value (e.g., "1"), the green value of a virtual illumination source may not be calculated as an illumination color vector. This is because intensity information of virtual illumination sources is removed and normalized values are provided in an illumination map 550.

In an example, the electronic device may generate the illumination map 550 using the plurality of mixture maps 520-1, 520-2, and 520-3 and the plurality of illumination color vectors 530-1, 530-2, and 530-3. The electronic device may perform white balancing on the input image using the generated illumination map 550. Hereinafter, a method of generating the illumination map 550 using the plurality of mixture maps 520-1, 520-2, and 520-3 and the plurality of illumination color vectors 530-1, 530-2, and 530-3 by the electronic device will be described in greater detail below with reference to FIG. 6.

Figure 6:
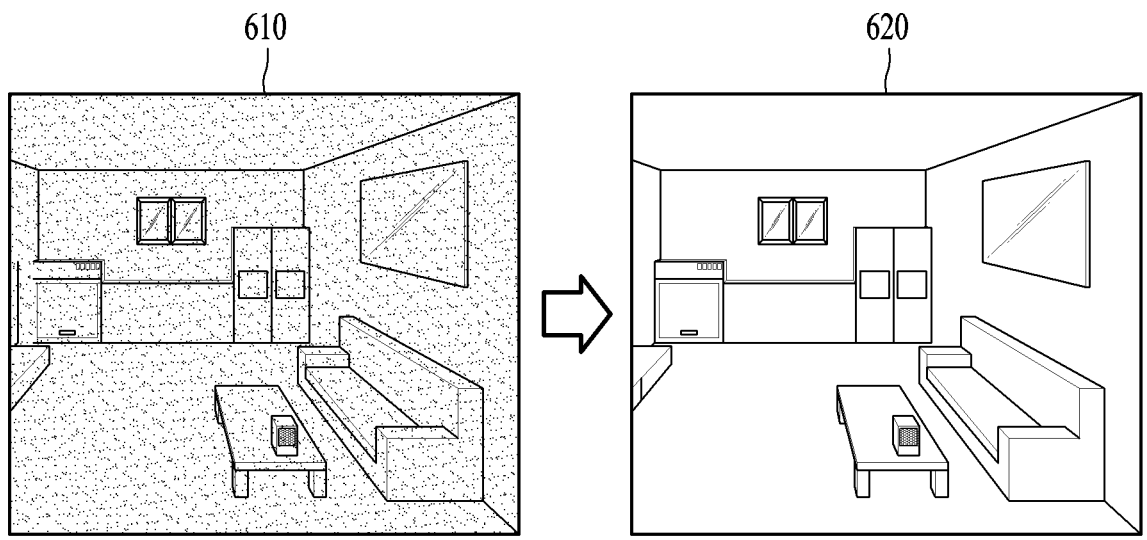
FIG. 6 illustrates an example process of performing white balancing on an input image using an illumination map according to one or more embodiments.

FIG. 6 illustrates an example process of performing white balancing on an input image using an illumination map according to one or more embodiments.

Referring to FIG. 6, in a non-limiting example, an electronic device (e.g., electronic device 1100 of FIG. 11) may perform white balancing on an input image 610 using an illumination map (e.g., the illumination map 550 of FIG. 5) generated by blending a plurality of mixture maps (e.g., the plurality of mixture maps 520-1, 520-2, and 520-3 of FIG. 5) and a plurality of illumination color vectors (e.g., the plurality of illumination color vectors 530-1, 530-2, and 530-3).

In an example, the electronic device may perform white balancing to remove all illumination sources present in the input image 610. In this case, the electronic device may calculate, for each of the plurality of virtual illumination sources, a result of multiplying an illumination color vector (e.g., the illumination color vector 530-1) corresponding to the corresponding illumination color vector by a mixture map (e.g., the mixture map 520-1) corresponding to the corresponding virtual illumination source. The electronic device may generate the illumination map by summing a calculated plurality of results along a channel axis. As described above, the electronic device may adjust a color value of a target pixel in the input image 610 using a color value of a pixel at the same position as the target pixel of the input image 610 in the illumination map. In an example, the electronic device may convert the red value of the target pixel in the input image 610 into a value obtained by dividing an existing red value by the red value of a pixel at the same position as the target pixel of the input image 610 in the illumination map and convert the blue value of the target pixel into a value obtained by dividing an existing blue value by the blue value of the pixel at the same position as the target pixel of the input image 610 in the illumination map, thereby performing white balancing on the input image 610. In an example, an image 620 of FIG. 6 may be a result of performing white balancing to remove all illumination sources present in the input image 610.

In another example, the electronic device may perform white balancing to individually adjust the illumination sources present in the input image 610. In this case, the electronic device may apply a weight to each of the plurality of illumination color vectors (e.g., the plurality of illumination color vectors 530-1, 530-2, and 530-3 of FIG. 5) corresponding to the plurality of virtual illumination sources. Here, the weight applied to each illumination color vector may correspond to the intensity of a virtual illumination corresponding to the corresponding illumination color vector in the input image 610 to be changed through white balancing. In an example, referring to FIG. 5, to reduce the intensity of a virtual illumination corresponding to the illumination color vector 530-1 in the input image 610 by 50% of the existing intensity through white balancing, the weight applied to the illumination color vector 530-1 may be set to "0.5". As another example, to reduce the intensity of the virtual illumination corresponding to the illumination color vector 530-1 in the input image 610 by 70% of the existing intensity through white balancing, the weight applied to the illumination color vector 530-1 may be set to "0.7". In other words, to change the intensity of the virtual illumination corresponding to the illumination color vector 530-1 in the input image 610 to 30% of the existing intensity through white balancing, the weight applied to the illumination color vector 530-1 may be set to "0.7". As an example, the virtual illumination sources corresponding to the illumination color vectors 530-1 and 530-2 among the plurality of virtual illumination sources in the input image 610 may be removed through white balancing, and to maintain the virtual illumination corresponding to the remaining illumination color vector 530-3 with the same intensity, the electronic device may apply a weight of "1" to each of the illumination color vectors 530-1 and 530-2 and apply a weight of "0" to the remaining illumination color vector 530-3.

The electronic device may calculate, for each of the plurality of virtual illumination sources, a candidate map by multiplying a result of applying a weight corresponding to an illumination color vector (e.g., the illumination color vector 530-1) corresponding to the corresponding virtual illumination to the illumination color vector, by a mixture map (e.g., the mixture map 520-1) corresponding to the corresponding virtual illumination. The electronic device may generate the illumination map by summing a calculated plurality of candidate maps along a channel axis. The electronic device may adjust the color values of pixels in the input image 610 using the generated illumination map.

Figure 7:
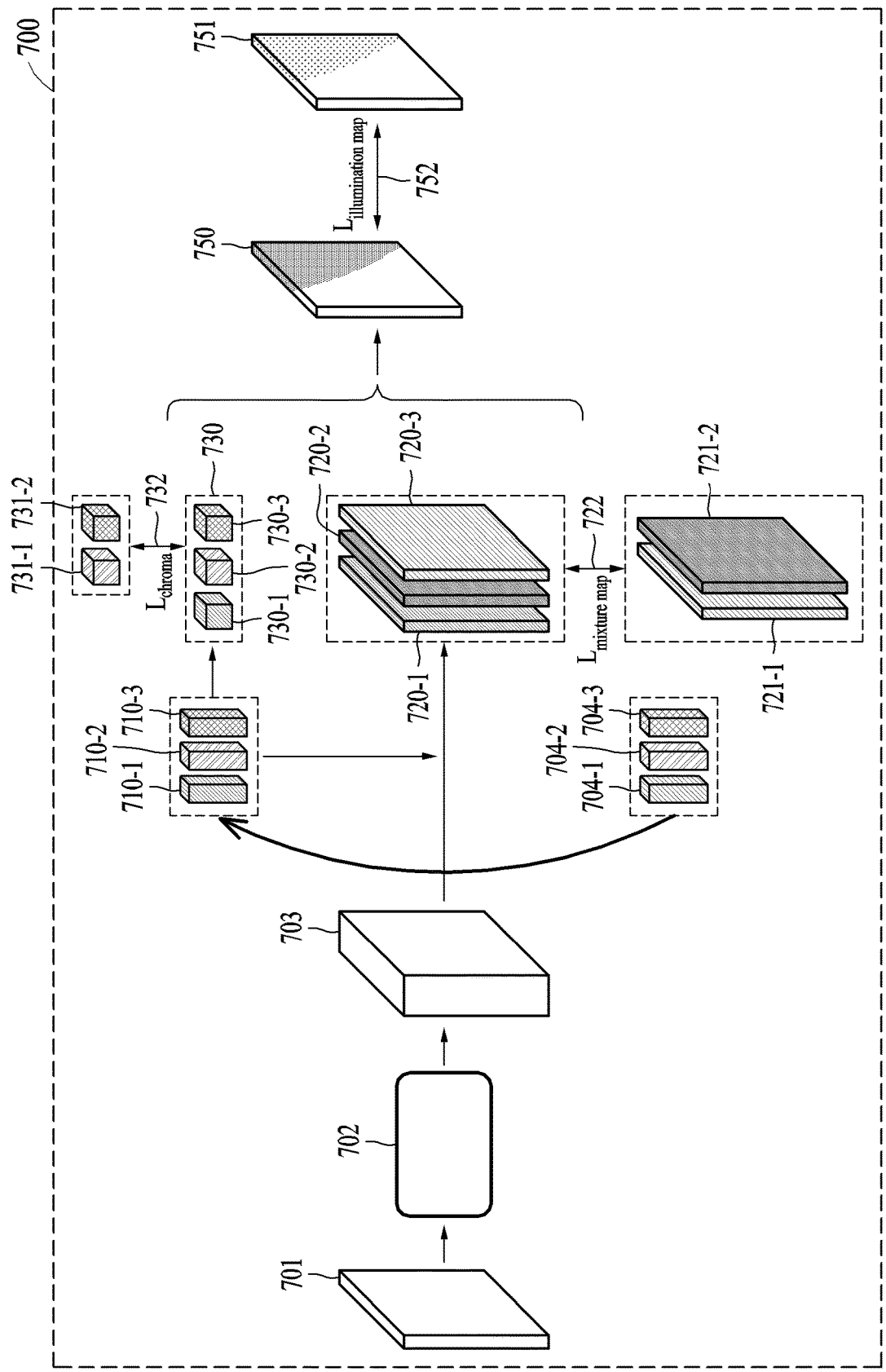
FIG. 7 illustrates an example process of training an illumination decomposition framework according to one or more embodiments.

FIG. 7 illustrates an example process of training an illumination decomposition framework according to one or more embodiments.

Referring to FIG. 7, in a non-limiting example, an electronic device (e.g., electronic device 1100 of FIG. 11) may train an illumination decomposition framework 700 to generate an illumination map based on an input image. The electronic device may train a machine learning model (e.g., the neural network 440 of FIG. 4) on the illumination decomposition framework 700 based on a total loss $\mathcal{L}_{total}$ including a plurality of losses. In an example, the electronic device may train the illumination decomposition framework 700 based on training data including a pair of training input data (e.g., a training input image 701) and training output data (e.g., a ground truth illumination map 751 mapped with the training input image 701, a plurality of ground truth illumination color vectors 731-1 and 731-2 mapped with the training input image 701, and a plurality of ground truth mixture maps 721-1 and 721-2 mapped with the training input image 701). The electronic device may train the illumination decomposition framework 700 to output the training output data from the training input data. When the total loss $\mathcal{L}_{total}$ decreases to be less than a threshold loss during training of the illumination decomposition framework 700 using the plurality of training data, the electronic device may terminate the training of the illumination decomposition framework 700.

In an example, the electronic device may calculate a temporary feature map 703 based on inputting the training input image 701 into an encoder 702. The electronic device may calculate a plurality of temporary mixture maps 720-1, 720-2, and 720-3 and a plurality of temporary illumination color vectors 730-1, 730-2, and 730-3 from the calculated temporary feature map 703. In an example, the electronic device may calculate a plurality of temporary predicted illumination vectors 710-1, 710-2, and 710-3 by iteratively updating a plurality of slot vectors 704-1, 704-2, and 704-3 using the calculated temporary feature map 703. The electronic device may calculate the plurality of temporary predicted illumination vectors 710-1, 710-2, and 710-3 based on inputting the calculated temporary feature map 703 and the plurality of slot vectors 704-1, 704-2, and 704-3 into a slot attention model (e.g., the slot attention model 320 of FIG. 3) including a machine learning model (e.g., the neural network model 440 of FIG. 4). The electronic device may calculate the plurality of temporary mixture maps 720-1, 720-2, and 720-3 and the plurality of temporary illumination color vectors 730-1, 730-2, and 730-3 using the plurality of temporary predicted illumination vectors 710-1, 710-2, and 710-3. The electronic device may generate a temporary illumination map 750 using the plurality of temporary mixture maps 720-1, 720-2, and 720-3 and the plurality of temporary illumination color vectors 730-1, 730-2, and 730-3.

In an example, the electronic device may train the illumination decomposition framework 700 based on the training data including the training input image 701, the ground truth illumination map 751 mapped with the training input image 701, the plurality of ground truth illumination color vectors 731-1 and 731-2 mapped with the training input image 701, and the plurality of ground truth mixture maps 721-1 and 721-2 mapped with the training input image 701.

In an example, the total loss $\mathcal{L}_{total}$ for training the illumination decomposition framework 700 may include an illumination map loss $L_{illumination\ map}$ 752 and an illumination color loss $\mathcal{L}_{chroma}$ 732. For example, the total loss $\mathcal{L}_{total}$ may be calculated as the sum of the illumination map loss 752 and the illumination color loss 732, but is not limited thereto.

The electronic device may calculate the illumination map loss 752 based on the temporary illumination map 750 and the ground truth illumination map 751 mapped with the training input image 701. The illumination map loss 752 may be a loss function based on the distance between the temporary illumination map 750 and the ground truth illumination map 751.

The electronic device may calculate the illumination color loss 732 based on the temporary illumination color vectors 730-1, 730-2, and 730-3 and the ground truth illumination color vectors 731-1 and 731-2 mapped with the training input image 701. The electronic device may calculate the illumination color loss 732 based on matching the temporary illumination color vectors 730-1, 730-2, and 730-3 and the ground truth illumination color vectors 731-1 and 731-2. The calculation of the illumination color loss 732 will be described in greater detail below with reference to FIGS. 8 and 9.

In another example, the total loss $\mathcal{L}_{total}$ for training the illumination decomposition framework 700 may include the illumination map loss $L_{illumination\ map}$ 752, the illumination color loss $\mathcal{L}_{chroma}$ 732, and a mixture map loss $L_{mixture\ map}$ 722. For example, the total loss $\mathcal{L}_{total}$ may be calculated as the sum of the illumination map loss 752, the illumination color loss 732, and the mixture map loss 722, but is not limited thereto.

The electronic device may calculate the mixture map loss 722 based on the plurality of temporary mixture maps 720-1, 720-2, and 720-3 and the plurality of ground truth mixture maps 721-1 and 721-2 matching the training input image 701. The electronic device may calculate the mixture map loss 722 based on matching the plurality of temporary mixture maps 720-1, 720-2, and 720-3 and the plurality of ground truth mixture maps 721-1 and 721-2. The calculation of the mixture map loss 722 will be described in greater detail below with reference to FIGS. 8 and 9.

In an example, an electronic device may calculate the illumination color loss 732 based on the plurality of temporary illumination color vectors 730-1, 730-2, and 730-3 and the plurality of ground truth illumination color vectors 731-1 and 731-2. The number of ground truth illumination color vectors matching the training input image 701 (e.g., "2") may be equal to the number of actual illumination sources present in the training input image 701. Since the electronic device generates a number of the slot vectors 704-1, 704-2, and 704-3 to be greater than or equal to the number of actual illumination sources present in an input image (e.g., the training input image 701), the number of temporary illumination color vectors (e.g., "3") may be greater than or equal to the number of ground truth illumination color vectors (e.g., "2").

In an example, the electronic device may determine a temporary illumination color vector matching a ground truth illumination color vector among the plurality of temporary illumination color vectors 730-1, 730-2, and 730-3, to calculate the illumination color loss 732. The electronic device may determine the temporary illumination color vector matching the ground truth illumination color vector, based on comparing a temporary mixture map (e.g., the temporary mixture map 720-1) corresponding to the temporary illumination color vector (e.g., the temporary illumination color vector 730-1) with a ground truth mixture map (e.g., the ground mixture map 731-1) corresponding to the ground truth illumination color vector (e.g., the ground truth illumination color vector 731-1).

Figure 8:
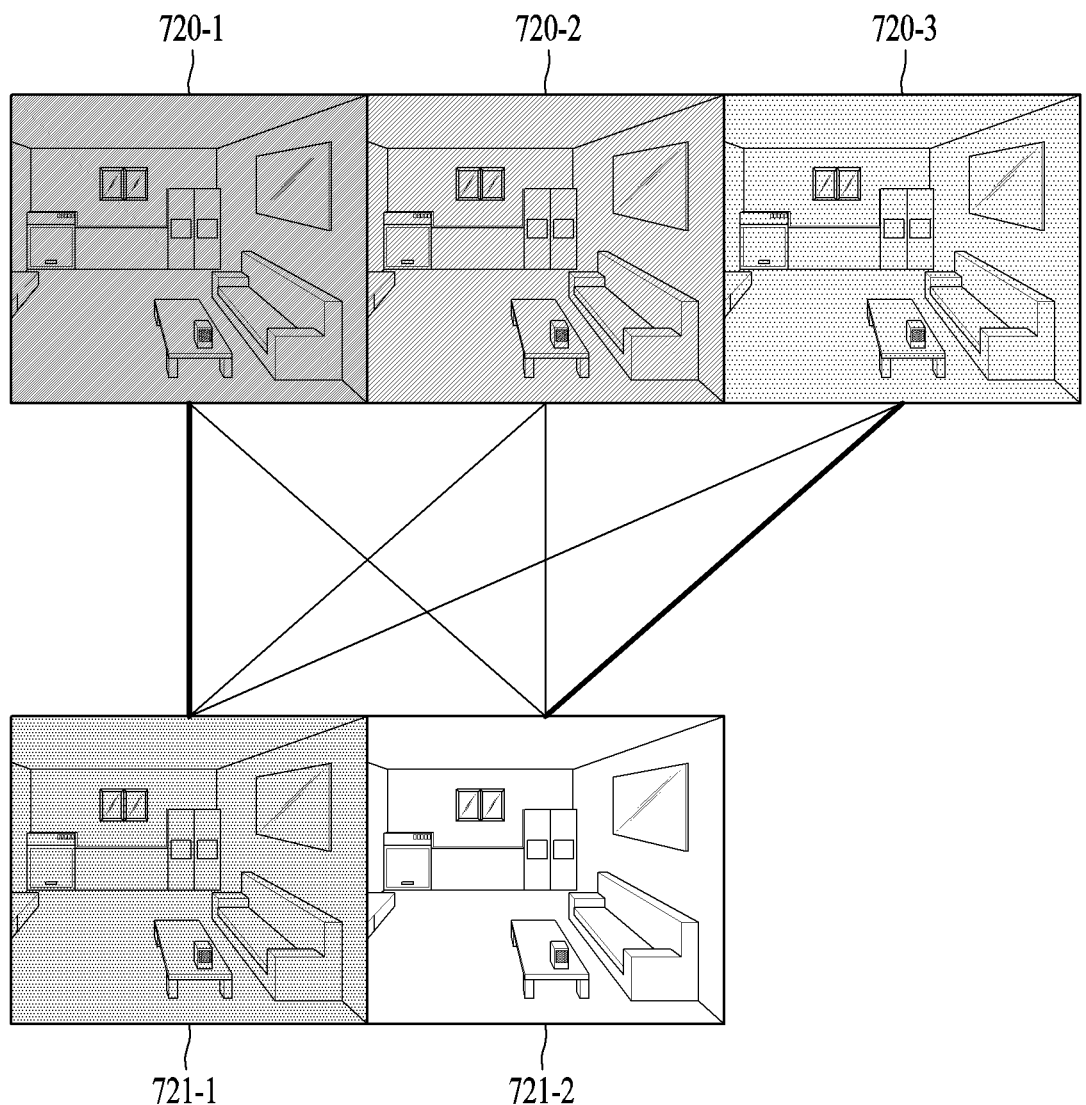
FIG. 8 illustrates an example process of calculating an illumination color loss and a mixture map loss according to one or more embodiments.

FIG. 8 illustrates an example process of calculating an illumination color loss and a mixture map loss according to one or more embodiments.

Referring to FIG. 8, in a non-limiting example, the electronic device may calculate the distance between any temporary mixture map (e.g., the temporary mixture map 720-1) among the plurality of temporary mixture maps 720-1, 720-2, and 720-3 and any ground truth mixture map (e.g., the ground truth mixture map 721-1) among the plurality of last 721-1 and 721-2. The distance between two mixture maps may be calculated based on a difference between the color values of corresponding pixels in one mixture map and the other mixture map. For example, the distance between the temporary mixture map 720-1 and the ground truth mixture map 721-1 may be calculated as "0.18", and the distance between the temporary mixture map 720-1 and the ground truth mixture map 721-2 may be calculated as "0.57".

The electronic device may calculate the distance between a temporary mixture map and a ground truth mixture map as a cost. The electronic device may set a plurality of distances calculated between the plurality of temporary mixture maps and the plurality of ground truth mixture maps as costs, and, in a non-limiting example, apply a Hungarian matching algorithm to the set costs. In an example, a 3×2 cost array may be formed. The electronic device may determine a temporary mixture map that matches an individual ground truth mixture map by applying the Hungarian matching algorithm to the set costs. The electronic device may apply the Hungarian matching algorithm such that the sum of the distances between ground truth mixture maps and temporary mixture maps matching each other may be minimized. In an example, through the Hungarian matching algorithm, the electronic device may match the ground truth mixture map 721-1 and the temporary mixture map 720-1, and match the ground truth mixture map 721-2 and the temporary mixture map 720-3.

Referring to FIG. 7, in a non-limiting example, the electronic device may match a ground truth illumination color vector (e.g., the ground truth illumination color vector 731-1) corresponding to an individual ground truth mixture map (e.g., the ground truth mixture map 721-1) and a temporary illumination color vector (e.g., the temporary illumination color vector 730-1) corresponding to a temporary mixture map (e.g., the temporary mixture map 720-1) matching the individual ground truth mixture map (e.g., the ground truth mixture map 721-1).

In an example, the electronic device may calculate the illumination color loss 732 using the ground truth illumination color vectors 731-1 and 731-2 and the temporary illumination color vectors 730-1 and 730-3 respectively matching the ground truth illumination color vectors 731-1 and 731-2. In an example, the electronic device may calculate, for each of the ground truth illumination color vectors 731-1 and 731-2, an error between a corresponding ground truth illumination color vector (e.g., the ground truth illumination color vector 731-1) and a temporary illumination color vector (e.g., the temporary illumination color vector 730-1) matching the corresponding ground truth illumination color vector (e.g., the ground truth illumination color vector 731-1), and calculate the illumination color loss 752 based on a calculated plurality of errors. In an example, referring to FIG. 7, the electronic device may calculate the illumination color loss 752 based on a difference between the color values of the ground truth illumination color vector 731-1 and the temporary illumination color vector 730-1 and a difference between the color values of the ground truth illumination color vector 731-2 and the temporary illumination color vector 730-3.

In an example, the electronic device may determine a temporary mixture map that matches a ground truth mixture map, to calculate the mixture map loss 722. The electronic device may determine the temporary mixture map that matches the ground truth mixture map, based on comparing the temporary mixture map (e.g., the temporary mixture map 720-1) with the ground truth mixture map (e.g., the ground truth mixture map 721-1). The method of determining a temporary mixture map (e.g., the temporary mixture map 720-1) that matches an individual ground truth mixture map (e.g., the ground truth mixture map 721-1) may be the same as the method described above.

In an example, the electronic device may calculate the mixture map loss 722 using the ground truth mixture maps 721-1 and 721-2 and the temporary mixture maps 720-1 and 720-3, respectively, to match the ground truth mixture maps 721-1 and 721-2. For example, the electronic device may calculate, for each of the ground truth mixture maps 721-1 and 721-2, an error between a corresponding ground truth mixture map (e.g., the ground truth mixture map 721-1) and a temporary mixture map (e.g., the temporary mixture map 720-1) that matches the corresponding ground truth mixture map (e.g., the ground truth mixture map 721-1), and calculate the mixture map loss 722 based on a calculated plurality of errors. In an example, referring to FIG. 7, the electronic device may calculate the mixture map loss 722 based on the distance between the ground truth mixture map 721-1 and the temporary mixture map 720-1 and the distance between the ground truth mixture map 721-2 and the temporary mixture map 720-3.

Figure 9:
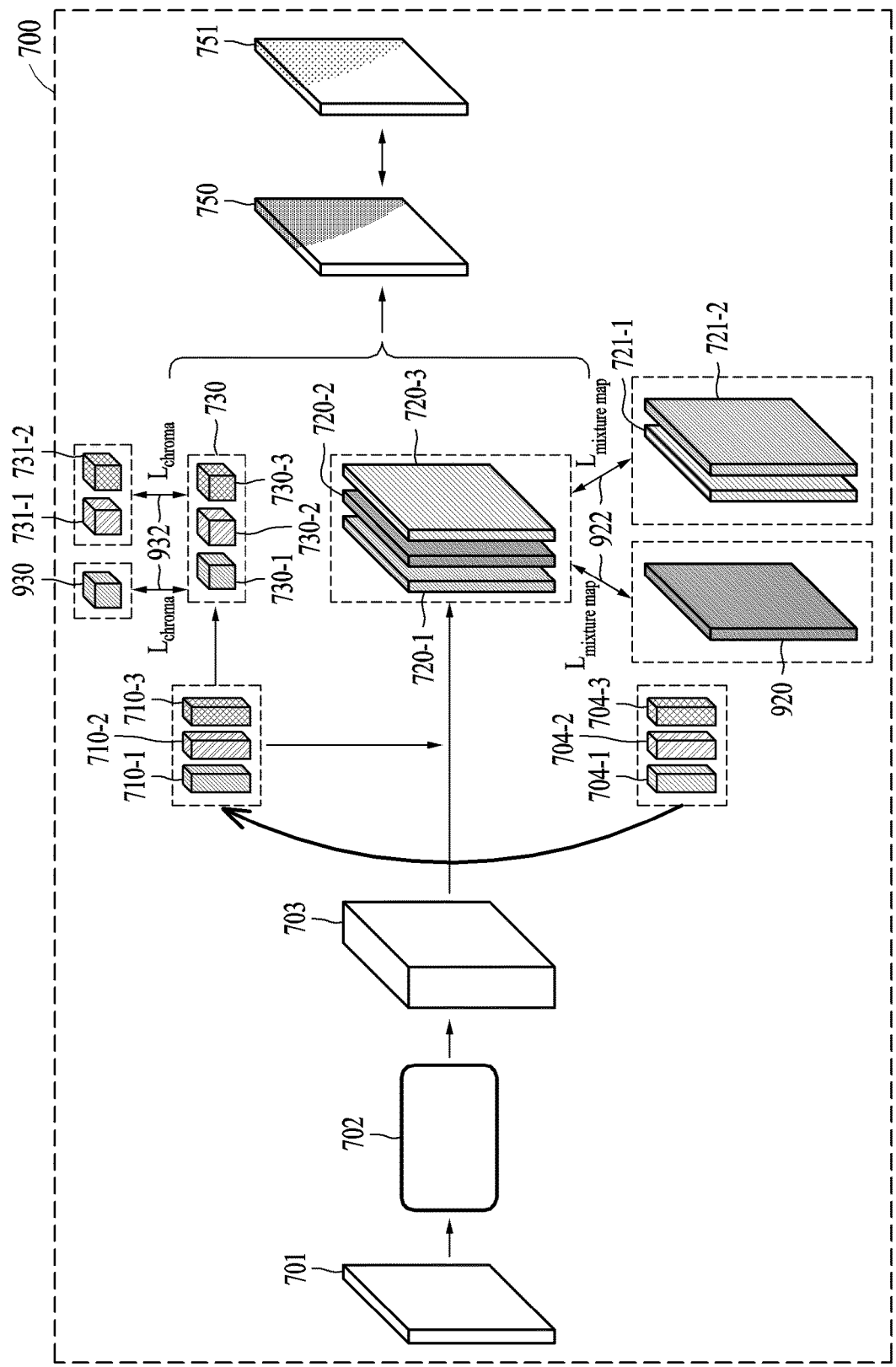
FIG. 9 illustrates an example process of calculating an illumination color loss and a mixture map loss according to one or more embodiments.

FIG. 9 illustrates an example process of calculating an illumination color loss and a mixture map loss according to one or more embodiments.

Referring to FIG. 9, in a non-limiting example, the plurality of slot vectors 704-1, 704-2, and 704-3 may be generated to be more than the number of actual illumination sources present in the training input image 701. In other words, the number of temporary illumination color vectors may exceed the number of ground truth illumination color vectors. Because of this example with a mismatch between the number of temporary illumination color vectors and the number ground truth illumination color vectors, among the plurality of temporary illumination color vectors 730-1, 730-2, and 730-3, at least one temporary illumination color vector 730-2 may not be match the ground truth illumination color vectors 731-1 and 731-2.

In an example, an electronic device may calculate an illumination color loss 932 using all the ground truth illumination color vectors 731-1 and 731-2, the temporary illumination color vectors 730-1 and 730-3, respectively, that matches the ground truth illumination color vectors 731-1 and 731-2, and the temporary illumination color vector 730-2 that does not match the ground truth illumination color vectors 731-1 and 731-2. The electronic device may generate a zero vector 930 corresponding to the temporary illumination color vector 730-2 not matching the ground truth illumination color vectors 731-1 and 731-2. Here, the zero vector 930 may be a two-dimensional vector in which all elements are "0". The electronic device may calculate the illumination color loss 932 based on an error between each ground truth illumination color vector (e.g., the ground truth illumination color vector 731-1) and a matching temporary illumination color vector (e.g., the temporary illumination color vector 730-1) and an error between the temporary illumination color vector 730-1 that does not match the ground truth illumination color vectors 731-1 and 731-2 and the zero vector 930.

Similarly, in an example, the electronic device may calculate a mixture map loss 922 using the ground truth mixture maps 721-1 and 721-2, the temporary mixture maps 720-1 and 720-3, respectively, that matches the ground truth mixture maps 721-1 and 721-2, and the temporary mixture map 720-2 that does not match the ground truth mixture maps 721-1 and 721-2. The electronic device may generate a zero map 920 corresponding to the temporary mixture map 720-2 that does not match the ground truth mixture maps 721-1 and 721-2. Here, the zero map 920 may be a mixture map that has the same size as a ground truth mixture map (e.g., the ground truth mixture map 721-1) and in which the weight values of pixels are all "0". The electronic device may calculate the mixture map loss 922 based on an error between each ground truth mixture map (e.g., ground truth mixture map 721-1) and a matching temporary mixture map (e.g., the temporary mixture map 720-1) and an error between the temporary mixture map 720-2 that does not match the ground truth mixture maps 721-1 and 721-2 and the zero map 920.

Figure 10:
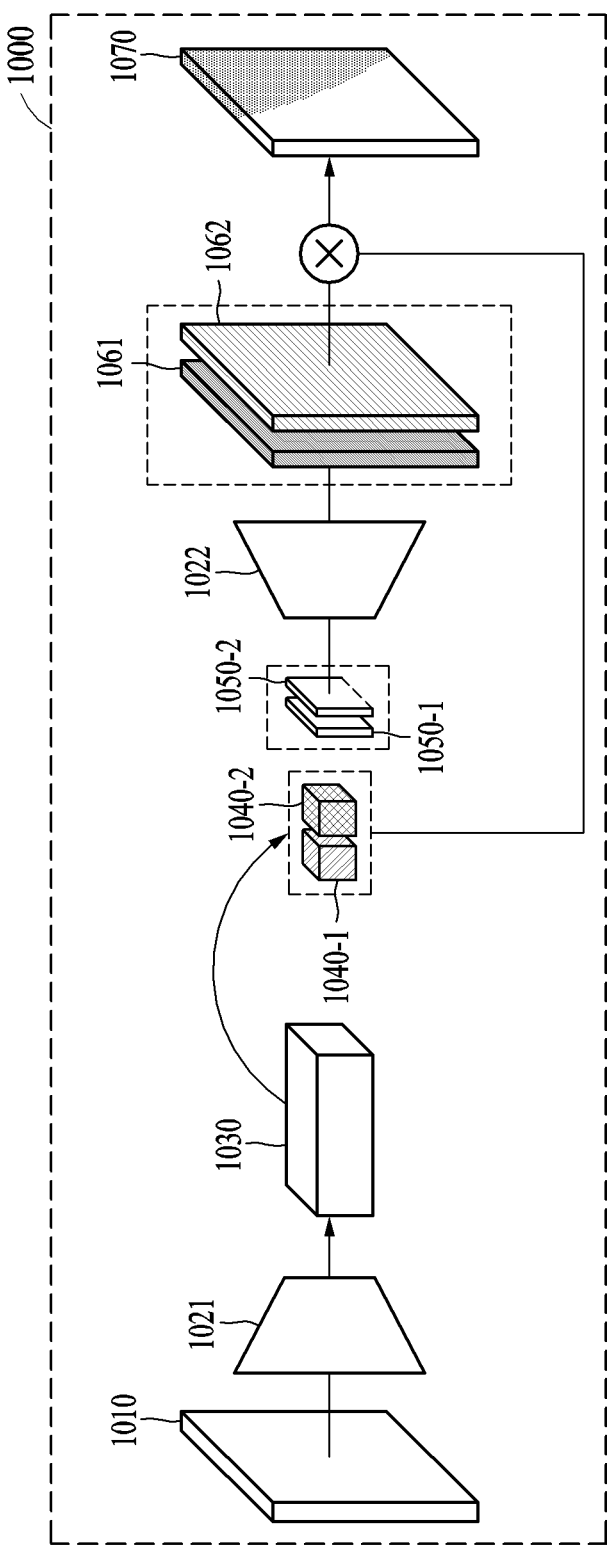
FIG. 10 illustrates an example process of calculating an illumination map from a low-resolution feature map according to one or more embodiments.

FIG. 10 illustrates an example process of calculating an illumination map from a low-resolution feature map according to one or more embodiments.

Referring to FIG. 10, in a non-limiting example, an electronic device (e.g., the electronic device 1110 of FIG. 11) may calculate a feature map 1030 including information about an illumination present in an input image 1010 based on inputting the input image 1010 into an encoder 1021. In an example, the feature map 1030 may have a second resolution lower than a first resolution (e.g., H×W) of the input image 1010. The electronic device may calculate an illumination map 1070 from the feature map 1030 having the second resolution lower than the first resolution of the input image 1010, thereby reducing the amount of computation compared to calculating an illumination map from a feature map (e.g., the feature map 230 of FIG. 2) having the first resolution which is the same as the first resolution of an input image (e.g., the input image 210 of FIG. 2).

In an example, the electronic device may calculate a plurality of predicted illumination vectors by iteratively updating a plurality of slot vectors using the feature map 1030 having the second resolution. The electronic device may calculate the plurality of predicted illumination vectors based on inputting the feature map 1030 having the second resolution and the plurality of slot vectors into a slot attention model (e.g., the slot attention model 320 of FIG. 3). The slot attention model may generate the plurality of predicted illumination vectors by iteratively updating the plurality of slot vectors using the feature map 1030 having the second resolution through an attention mechanism. The predicted illumination vectors may be two-dimensional vectors. In this case, an illumination decomposition framework 1000 may perform the attention calculation process, which occupies a large portion of the amount of calculation, using the feature map 1030 of the second resolution lower than the first resolution, which may reduce the amount of computation required.

In an example, the electronic device may calculate a plurality of mixture maps 1050-1 and 1050-2 and a plurality of illumination color vectors 1040-1 and 1040-2 using the calculated plurality of predicted illumination vectors. A mixture map (e.g., the mixture map 1050-1) may have the same size as the second resolution of the feature map 1030. Accordingly, the electronic device may input each of the plurality of mixture maps 1050-1 and 1050-2 into a decoder 1022 and upscale each of the plurality of mixture maps 1050-1 and 1050-2 to the first resolution that is the same as the resolution of the input image 1010. The electronic device may generate the illumination map 1070 using upscaled mixture maps 1061 and 1062 and the plurality of illumination color vectors 1040-1 and 1040-2.

Figure 11:
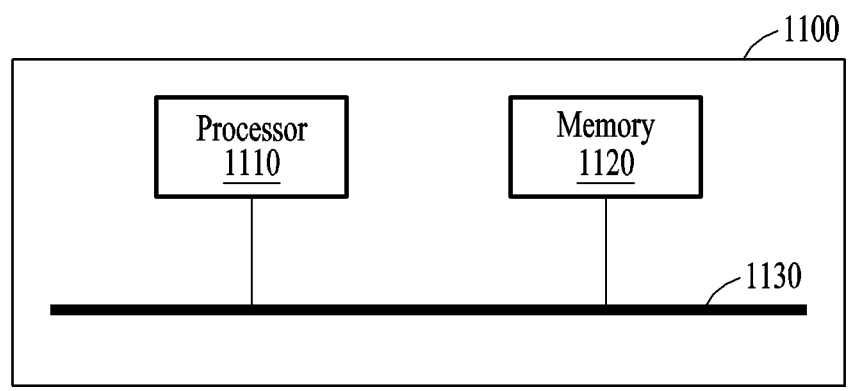
FIG. 11 illustrates an example electronic apparatus with white balancing according to one or more embodiments.

FIG. 11 illustrates an example electronic apparatus 1100 with white balancing according to one or more embodiments.

Referring to FIG. 11 in a non-limiting example, an electronic apparatus 110 may include a processor 1110, a memory 1120, and bus 1130. In an example, the electronic apparatus 1100 may be the electronic devices described above with reference to FIGS. 1-10. The processor 1110 may be configured to execute computer-readable instructions, which when executed by the processor 1110, configure the processor 1110 to perform one or more or all operations and/or methods involving the white balancing operations or perform any one or any combination of the operations and/or methods described herein. The processor 1110 may include any one or a combination of two or more of, for example, a central processing unit (CPU), a graphic processing unit (GPU), a neural processing unit (NPU) and tensor processing units (TPUs), but is not limited to the above-described examples. In an example, the processor 1110 may perform the operations of the neural network 440 of FIG. 4. The processor 1110 may also execute other computer-readable instructions, programs, or applications to control other functionalities of the electronic device.

The memory 1120 may be configured to store, or store, any of the computer-readable instructions described herein. The memory 1120 may be a volatile or nonvolatile memory. The memory 1120 may include, for example, random-access memory (RAM), dynamic random-access memory (DRAM), static random-access memory (SRAM), or other types of non-volatile memory known in the art.

The processors, electronic devices, neural networks, electronic apparatus 1100, processor 1110, memory 1120, described herein and disclosed herein described with respect to FIGS. 1-11 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:
   inputting an image into an encoder to generate a feature map including information about an illumination present in the input image;
   iteratively updating a plurality of slot vectors using the calculated feature map to calculate a plurality of predicted illumination vectors;
   calculating, using the calculated plurality of predicted illumination vectors, a plurality of mixture maps representing respective effects of a plurality of virtual illuminations on pixels in the input image and a plurality of illumination color vectors representing respective color values of the plurality of virtual illuminations; and
   generating an illumination map using the calculated plurality of mixture maps and the calculated plurality of illumination color vectors.

2. The method of claim 1, wherein respective dimensions of each of the plurality of slot vectors are equal to a number of channels of the calculated feature map.

3. The method of claim 1, wherein the iteratively updating the plurality of slot vectors comprise updating the plurality of slot vectors a preset number of times through a neural network model.

4. The method of claim 3, wherein the iteratively updating the plurality of slot vectors further comprises:
   inputting the calculated feature map into a multi-layer perceptron to calculate a key and a value having a same size as the calculated feature map; and
   setting the plurality of slot vectors as a query.

5. The method of claim 4, wherein the iteratively updating the plurality of slot vectors further comprises:
   applying a softmax function to a result of a dot product between the query and the key along a channel axis to calculate a plurality of attention maps;
   normalizing the calculated plurality of attention maps along a spatial axis and then multiplying the normalized plurality of attention maps by the value to calculate a plurality of candidate vectors; and
   inputting the calculated plurality of candidate vectors into the neural network model to update the plurality of slot vectors with output values of the neural network model.

6. The method of claim 3, wherein the neural network model comprises one of a decoder of a transformer model, a long short-term memory (LSTM) model, and a gated recurrent unit (GRU) model.

7. The method of claim 4, wherein the calculating of the plurality of mixture maps and the plurality of illumination color vectors comprises:
applying a softmax function to results of dot products between the calculated plurality of predicted illumination vectors and the key along a channel axis to calculate the plurality of mixture maps; and
inputting the calculated plurality of predicted illumination vectors into a linear layer to calculate the plurality of illumination color vectors.

8. The method of claim 1, wherein the generating of the illumination map comprises:
setting weights respectively for the plurality of illumination color vectors corresponding to the plurality of virtual illuminations;
multiplying, for each of the plurality of virtual illuminations, a result of applying a weight, set for an illumination color vector corresponding to a corresponding virtual illumination, to the corresponding illumination color vector by a mixture map corresponding to the corresponding virtual illumination to calculate a candidate map; and
summing a plurality of candidate maps calculated respectively for the plurality of virtual illuminations along a channel axis to generate the illumination map.

9. The method of claim 1, further comprising:
training an illumination decomposition framework for generating the illumination map from the input image based on training data comprising a training input image, a ground truth illumination map mapped with the training input image, a plurality of ground truth illumination color vectors mapped with the training input image, and a plurality of ground truth mixture maps mapped with the training input image.

10. The method of claim 9, wherein the training of the illumination decomposition framework comprises:
inputting the training input image into the encoder to calculate a temporary feature map;
calculating a plurality of temporary mixture maps and a plurality of temporary illumination color vectors from the calculated temporary feature map;
calculating a temporary illumination map using the calculated plurality of temporary mixture maps and the calculated plurality of temporary illumination color vectors;
calculating an illumination map loss based on the temporary illumination map and the ground truth illumination map;
calculating an illumination color loss based on the plurality of temporary illumination color vectors and the plurality of ground truth illumination color vectors; and
training the illumination decomposition framework based on a total loss comprising the calculated illumination map loss and the calculated illumination color loss.

11. The method of claim 10, wherein the calculating of the illumination color loss comprises:
determining a temporary illumination color vector matching an individual ground truth illumination color vector among the plurality of temporary illumination color vectors; and
calculating the illumination color loss using the plurality of ground truth illumination color vectors and temporary illumination color vectors respectively matching the plurality of ground truth illumination color vectors.

12. The method of claim 11, wherein the determining of the temporary illumination color vector matching the individual ground truth illumination color vector comprises:
calculating a distance between any temporary mixture map among the plurality of temporary mixture maps and any ground truth mixture map among the plurality of ground truth mixture maps;
setting a plurality of distances calculated between the plurality of temporary mixture maps and the plurality of ground truth mixture maps as costs and applying a Hungarian matching algorithm to the set costs to determine a temporary mixture map matching an individual ground truth mixture map by; and
matching a ground truth illumination color vector corresponding to the individual ground truth mixture map and a temporary illumination color vector corresponding to a temporary mixture map matching the individual ground truth mixture map.

13. The method of claim 10, wherein the training of the illumination decomposition framework comprises:
calculating a mixture map loss based on the plurality of temporary mixture maps and the plurality of ground truth mixture maps; and
training the illumination decomposition framework based on the total loss comprising the calculated illumination map loss, the calculated illumination color loss, and the calculated mixture map loss.

14. An electronic device, the device comprising:
a processor configured to:
calculate a feature map comprising information about an illumination present in an input image based on inputting the input image into an encoder;
calculate a plurality of predicted illumination vectors by iteratively updating a plurality of slot vectors using the calculated feature map;
calculate, using the calculated plurality of predicted illumination vectors, a plurality of mixture maps representing respective effects of a plurality of virtual illuminations on pixels in the input image and a plurality of illumination color vectors representing respective color values of the plurality of virtual illuminations; and
calculate an illumination map using the calculated plurality of mixture maps and the calculated plurality of illumination color vectors.

15. The device of claim 14, wherein the processor is further configured to calculate a key and a value having a same size as the calculated feature map by inputting the calculated feature map into a multi-layer perceptron, and set the plurality of slot vectors as a query.

16. The device of claim 15, wherein the processor is further configured to:
calculate a plurality of attention maps by applying a softmax function to a result of a dot product between the query and the key along a channel axis;
calculate a plurality of candidate vectors by normalizing the calculated plurality of attention maps along a spatial axis and then multiplying the normalized plurality of attention maps by the value; and
update the plurality of slot vectors with output values of the neural network model based on inputting the calculated plurality of candidate vectors into the neural network model.

17. The device of claim 15, wherein the processor is further configured to:

calculate the plurality of mixture maps by applying a softmax function to results of dot products between the calculated plurality of predicted illumination vectors and the key along a channel axis; and calculate the plurality of illumination color vectors by inputting the calculated plurality of predicted illumination vectors into a linear layer.

18. The device of claim 14, wherein the processor is further configured to:

set weights respectively for the plurality of virtual illuminations;

generate, for each of the plurality of virtual illuminations, a candidate map by multiplying a result of applying a weight, set for an illumination color vector corresponding to a corresponding virtual illumination, to the corresponding illumination color vector by a mixture map corresponding to the corresponding virtual illumination; and generate the illumination map by summing a plurality of candidate maps calculated respectively for the plurality of virtual illuminations along a channel axis.

19. The device of claim 14, wherein the processor is further configured to train an illumination decomposition framework for generating the illumination map from the input image based on training data comprising a training input image, a ground truth illumination map mapped with the training input image, a plurality of ground truth illumination color vectors mapped with the training input image, and a plurality of ground truth mixture maps mapped with the training input image.

20. The device of claim 19, wherein the processor is further configured to:

calculate a temporary feature map based on inputting the training input image into the encoder;

calculate a plurality of temporary mixture maps and a plurality of temporary illumination color vectors from the calculated temporary feature map;

calculate a temporary illumination map using the calculated plurality of temporary mixture maps and the calculated plurality of temporary illumination color vectors;

calculate an illumination map loss based on the temporary illumination map and the ground truth illumination map;

calculate an illumination color loss based on the plurality of temporary illumination color vectors and the plurality of ground truth illumination color vectors; and train the illumination decomposition framework based on a total loss comprising the calculated illumination map loss and the calculated illumination color loss.

21. A processor-implemented method, the method comprising:

generating, by an encoder employing a neural network, a feature map according to lamination information of an input image;

iteratively updating slot vectors of a plurality of slot vectors using the feature map to predict illumination vectors from the feature map;

calculating, using the illumination vectors, a plurality of mixture maps representing representative effects of virtual illumination sources; and generating an illumination map for the input image based on the representative effects and the plurality of mixture maps.

22. The method of claim 21, wherein the representative effects of the virtual illumination sources include effects on respective pixels in the input image and a plurality of color vectors from respective virtual illumination sources.

23. The method of claim 21, further comprising performing white balancing on the input image by blending the representative effects and the plurality of mixture maps.

24. The method of claim 21, wherein a first number of the plurality of slot vectors is greater than or equal to a second number of light sources present in the input image.

25. The method of claim 24, wherein a third number of channels of the feature map is equal to a fourth number of dimensions of the feature map.

26. The method of claim 21, wherein the iterative updating of the plurality of slot vectors is generated by a slot attention model calculating a key and a value, the value being a size of the feature map.

27. The method of claim 26, wherein the slot attention model further calculates a query based on the plurality of slot vectors, and wherein the calculating the plurality of mixture maps by applying a softmax function to a dot product between the key and the query.

* * * * *